United States Patent
LaCroix et al.

(10) Patent No.: US 8,741,139 B2
(45) Date of Patent: Jun. 3, 2014

(54) CYLINDRICAL CARTRIDGE FILTER WITH DETACHABLE CORE

(76) Inventors: Paul LaCroix, Louisville, KY (US); Barry LaCroix, Corunna (CA)

(*) Notice: Subject to any disclaimer, the term of this patent is extended or adjusted under 35 U.S.C. 154(b) by 232 days.

(21) Appl. No.: 13/312,121

(22) Filed: Dec. 6, 2011

(65) Prior Publication Data
US 2012/0160755 A1 Jun. 28, 2012

Related U.S. Application Data

(60) Provisional application No. 61/425,802, filed on Dec. 22, 2010.

(51) Int. Cl.
| | |
|---|---|
| B01D 27/06 | (2006.01) |
| B01D 29/11 | (2006.01) |
| B01D 29/13 | (2006.01) |
| B01D 29/21 | (2006.01) |
| B01D 27/00 | (2006.01) |
| B01D 29/00 | (2006.01) |

(52) U.S. Cl.
USPC ............... 210/232; 210/497.01; 210/493.2; 210/437; 210/485; 210/450; 210/455; 55/378; 55/379; 55/490; 55/492

(58) Field of Classification Search
CPC . B01D 29/0029; B01D 29/13; B01D 2201/24
USPC ......... 210/497.01, 493.2, 437, 499, 232, 485, 210/486, 450, 451, 455; 55/378, 379, 490, 55/492
See application file for complete search history.

(56) References Cited

U.S. PATENT DOCUMENTS

| | | | | |
|---|---|---|---|---|
| 2,029,078 | A * | 1/1936 | Matney | 210/223 |
| 4,293,111 | A * | 10/1981 | Henri | 248/95 |
| 2001/0010297 | A1* | 8/2001 | Pulek et al. | 210/493.2 |

* cited by examiner

*Primary Examiner* — Nam Nguyen
*Assistant Examiner* — Madeline Gonzalez

(57) ABSTRACT

The present device is a detachable core for use with a cylindrical filter cartridge. The core includes a wire frame including at least two vertical struts oriented along a longitudinal direction. The wire frame includes an upper ring and a lower ring mounted to the distal ends of the vertical struts and further includes an upper flange and a lower flange mounted to the upper and lower rings respectively, wherein the lower flange is detachably mounted to the lower ring. Preferably the lower ring includes a gap in the lower ring to enable resilient compression of the ring by squeezing the lower ring in a radial inward direction prior to engagement with the lower flange. Preferably the cartridge filter includes elastomeric end caps and the cooperating rings and flanges are non-circular such that the elastomeric end caps conforms to the non-circular shape of the upper and lower flanges.

16 Claims, 5 Drawing Sheets

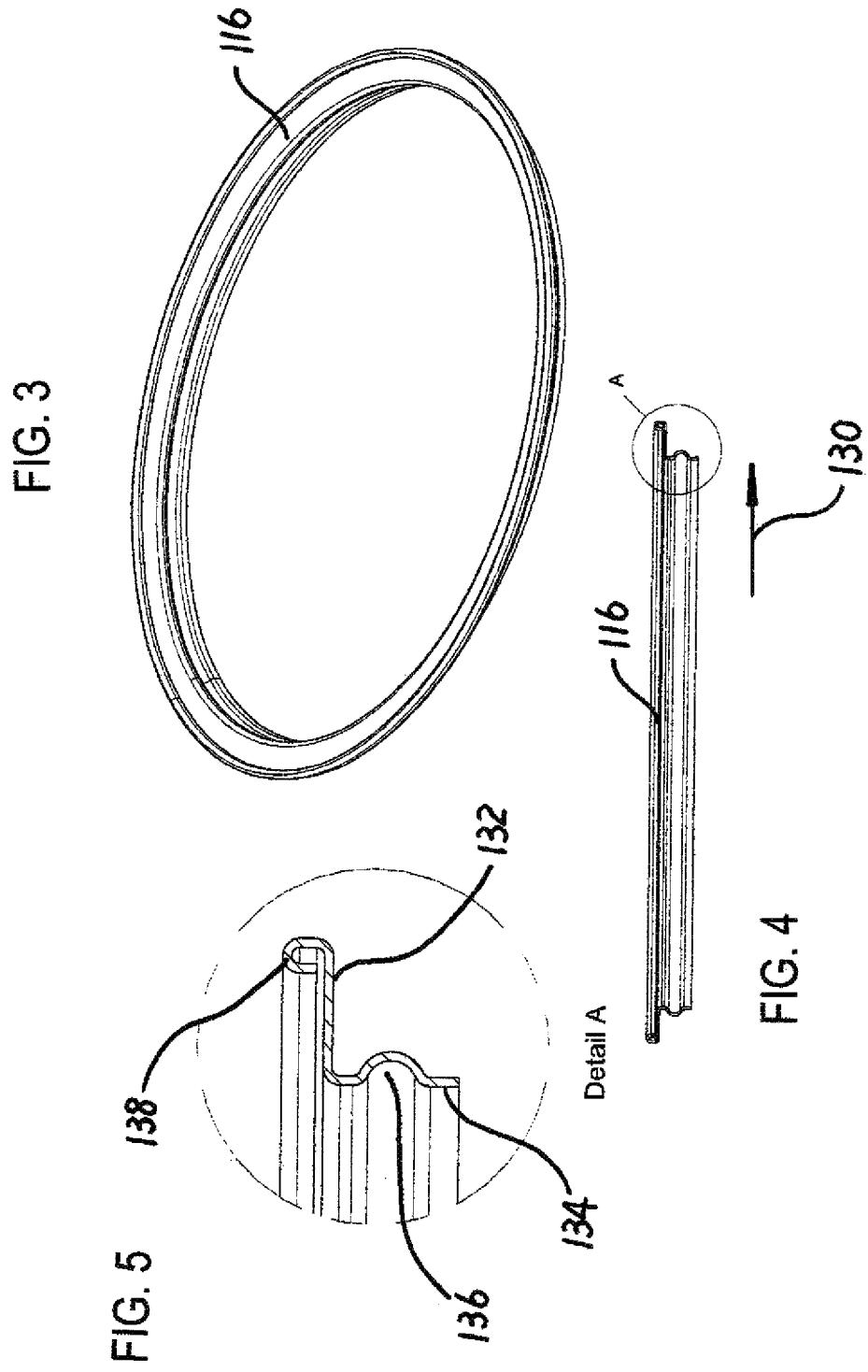

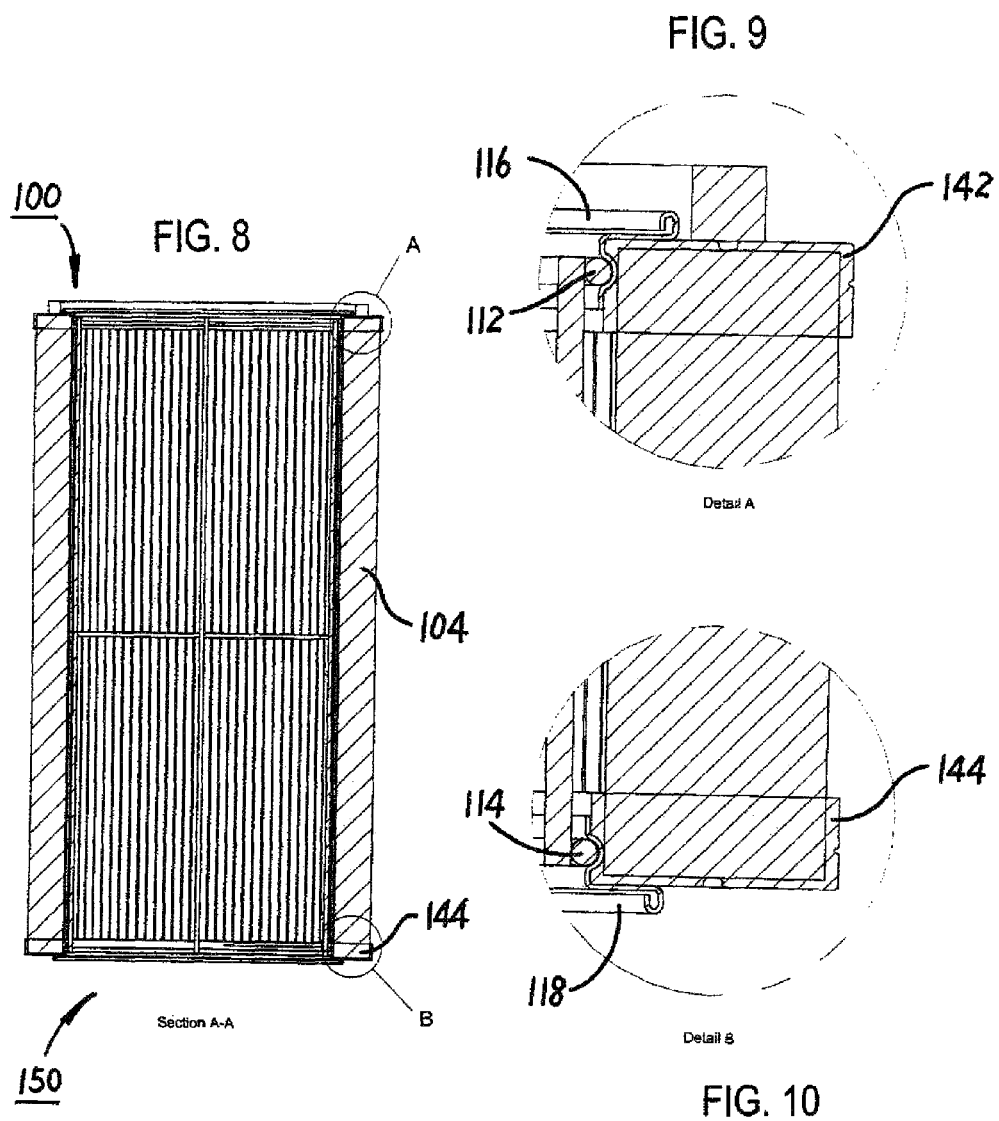

CYLINDRICAL CARTRIDGE FILTER WITH DETACHABLE CORE

The application claims priority from previously filed U.S. provisional patent application Ser. No. 61/425,802 titled CYLINDRICAL CARTRIDGE FILTER WITH NON-CYLINDRICAL CORE, which was filed on Dec. 22, 2010 by Paul LaCroix and Barry LaCroix.

FIELD OF THE INVENTION

The following concept relates generally to filter cartridges and specifically to a filter cartridge core or inner support structure that is detachable and non-cylindrical.

BACKGROUND OF THE INVENTION

Filter cartridges are primarily used for the purpose of removing particulate matter from a fluid stream. The filter cartridges are generally installed in the collection structure where the filter element is mounted downstream in the fluid flow. Filter cartridges are typically composed of a filter element, which may be a sock or bag made of suitable material or pleated paper. For the purpose of this concept the filter element of pleated paper is formed into a cylindrical shape and held by two collars or end caps molded or formed out of a suitable material. In this case the end caps are made out of a soft elastomeric material and can be easily formed into shapes other than circular. A rigid inner core is employed to maintain the filter elements shape throughout its length.

Presently filter cartridges have inner cores, which are permanently installed in the filter assembly and cannot be easily removed. These cores are commonly made from perforated sheet metal or metal screening. When a filter cartridge has reached it's life expectancy it is preferably disposed of in a manner which is not harmful to the environment specifically when the filtered particulate matter is hazardous material it is desirable to incinerate the filters. The difficulty with the existing cartridge filters with metal cores that cannot be easily removed is that they cannot be completely incinerated neither can they be disposed of without increased processing primarily due to the metal core components. The present concept allows for the metal core to be easily and quickly detached from the non-metallic components of the filter such that the non-metallic filter components can be easily incinerated and metallic core components can be recycled or used again until worn or damaged.

In addition many filtration systems require the use of non-cylindrical filter cartridges. The majority of the non-cylindrical filter cartridges are elliptical or rectangular. Apparently non-cylindrical cartridge filters employ non-cylindrical end caps that require great resources to produce. The present concept however allows a filter element with cylindrical end caps to be used where the application of non-cylindrical cartridge filter is required. In this manner a standard cylindrical cartridge filter element can be used instead of employing a non-cylindrical cartridge or filter element.

The current concept uses filter cartridge or cylinder filter elements, which have relatively soft elastomeric material for the end caps. In this manner the end caps are easily deformable as are the filter pleats. A non-cylindrical core is introduced into the elastomeric end cap of the cylindrical filter element thereby creating a non-cylindrical filter cartridge shape.

SUMMARY OF THE INVENTION

The present invention is detachable core for use with a cylindrical filter cartridge, the detachable core comprises:

a) a wire frame which includes at least two vertical struts oriented along a longitudinal direction;
b) the wire frame includes an upper ring and a lower ring mounted to the distal ends of the vertical struts;
c) the wire frame, includes an upper flange and a lower flange cooperatively mounted to the upper and lower rings respectively;
d) wherein the lower ring includes a means for detachably mounting to the lower flange thereby allowing the filter cartridge to be inserted and detached from the core by sliding the cartridge on and off of the core along the longitudinal direction.

Preferably wherein the means for detachably mounting includes a gap in the lower ring to enable resilient compression of the ring by squeezing the lower ring in a radial inward direction prior to engagement with the lower flange.

Preferably wherein the lower ring resiliently engages in the radial outward direction with a groove defined in the lower flange thereby placing the lower ring in an attached position.

Preferably wherein the groove defined in the lower flange is a semi-circular groove.

Preferably wherein the flanges include a longitudinal leg and a radial leg for engaging with end caps of the filter cartridge.

Preferably wherein the vertical struts are rigidly connected to the upper ring.

Preferably further including a central ring rigidly mounted to the vertical struts, midway between the distal ends of the vertical struts.

Preferably including three vertical struts.
Preferably including four vertical struts.

Preferably wherein the cartridge filter includes elastomeric end caps and the rings and flanges are cooperatively non-circular such that the elastomeric end caps of a cylindrical filter cartridge conforms to the non-circular shape of the upper and lower flanges when mounted thereon and in an assembled position.

The core claimed in claim 10 wherein, the rings and cooperating flanges are oval in shape.

The present device a detachable non-cylindrical core for use with a cylindrical filter cartridge having elastomeric end caps, the detachable non-cylindrical core comprises:

e) a wire frame which includes at least two vertical struts oriented along a longitudinal direction;
f) the wire frame includes a non-circular upper ring and a non-circular lower ring mounted to the distal ends of the vertical struts;
g) the wire frame includes a non-circular upper flange and a non-circular lower flange cooperatively mounted to the non-circular upper and lower rings respectively;
h) wherein the non-circular lower ring includes a means for detachably mounting to the non-circular lower flange thereby allowing the filter cartridge to be inserted and detached from the core by sliding the cartridge on and off of the core along the longitudinal direction;
i) such that the elastomeric end caps of a cylindrical filter cartridge conforms to the non-circular shape of the upper and lower flanges when mounted thereon.

BRIEF DESCRIPTION OF THE DRAWINGS

The concept will now be described by way of example only with reference to the following drawings in which;

FIG. 3 is a perspective view of an upper flange.

FIG. 4 is a side elevational view of an upper flange shown in FIG. 3.

FIG. 5 is a enlarged cross sectional view of the flange showing detail A of FIG. 4.

FIG. 8 is a partial cross-sectional view of a non-cylindrical core together with a filter cartridge in an assembled position showing the upper flange and lower flange attached to the cylindrical soft elastomeric end caps of the filter cartridge.

FIG. 9 is an enlarged partial cross-sectional view of the top portion feature A of FIG. 8 of the elastomeric end cap with the upper flange in position and the upper non-cylindrical ring in position as well.

FIG. 10 is an enlarged partial cross sectional view showing feature B shown in FIG. 8 showing the soft elastomeric end cap positioned in the lower flange together with the lower non-circular ring.

DESCRIPTION OF THE PREFERRED EMBODIMENTS

The present concept a cylindrical cartridge filter 100 with a detachable core which may be cylindrical or as shown a non-cylindrical core 102 shown in FIG. 8 includes the following major components namely a detachable core 102 and a cylindrical filter cartridge 104. In a preferred embodiment the core is a non-cylindrical core 102.

It is understood that throughout this specification the core referred to as non-cylindrical core 102 is detachable from the filter cartridge and may be cylindrical or may in fact be non-cylindrical.

Figures 6, 7:
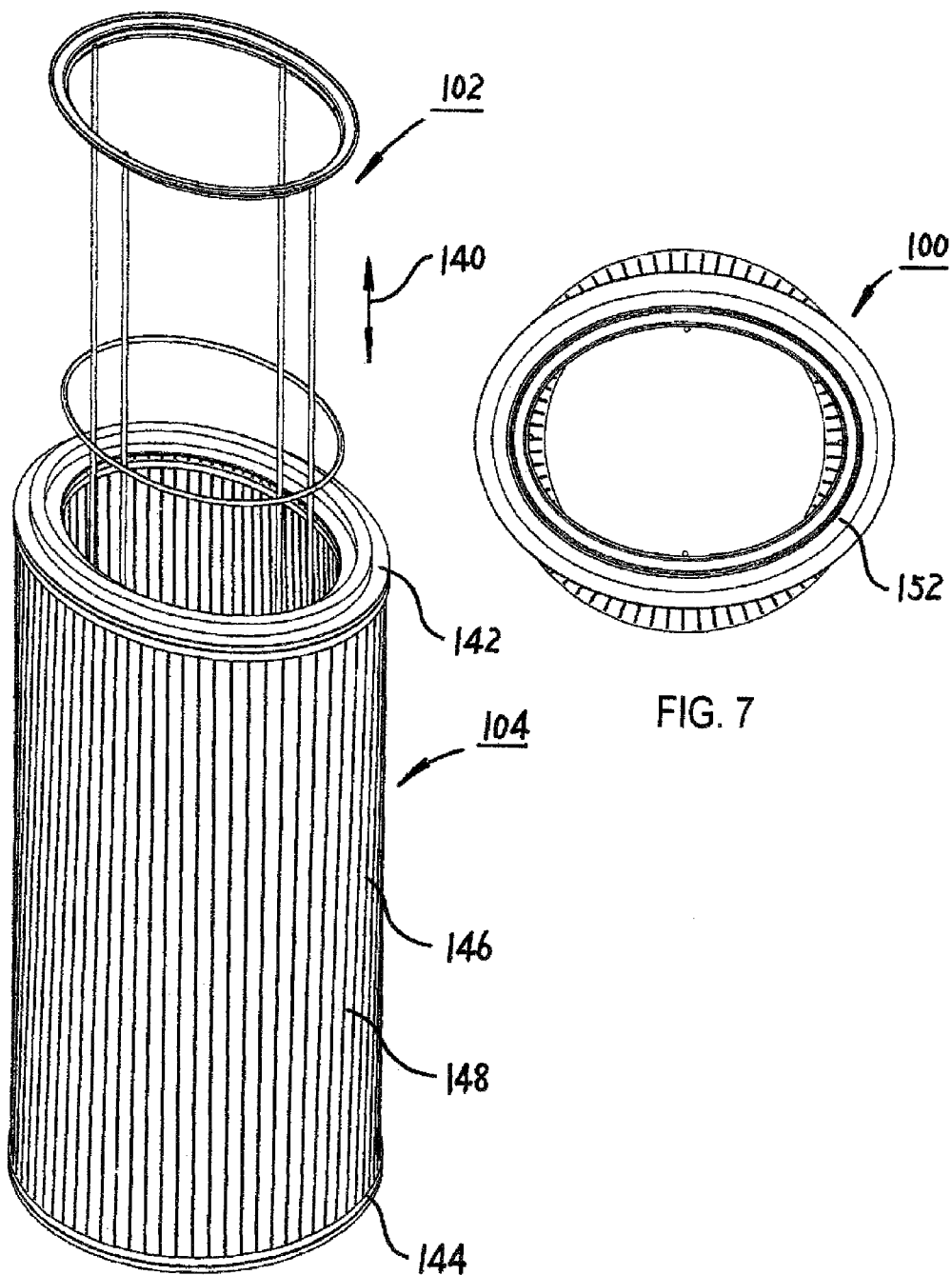
FIG. 6 is an assembly drawing showing the insertion of the cylindrical core into a filter cartridge.
FIG. 7 is a top plan view of a non-cylindrical core and the filter cartridge in an assembled position showing non-cylindrical feature.

Referring first of all to FIGS. 1 through 5 inclusively which depict the non-cylindrical core 102 which includes the following major components namely a wire frame 108 which includes vertical struts 110, upper non-circular ring 112, a lower non-circular ring 114, an upper flange 116 and a detachable lower flange 118 as well as a central non-circular ring 120. Upper flange 116 and lower flange 118 are also non-circular as shown in FIG. 7. The shape of the rings 112 and 114 correspond to the shape of the flanges 116 and 118 respectively. In the case where the core is cylindrical rings 112 and 114 and 120 are circular as well flanges 116 and 118 are also circular. These elements are referred to as rings or non-cylindrical rings and flanges and non-cylindrical flanges.

The reader will note that there is a gap 122 in the lower non-circular ring 114.

Upper flange 116 is rigidly mounted to upper ring 112 normally by spot welding or otherwise bonding upper ring 112 to upper flange 116. The rings 112 and 114 may in fact be circular for applications requiring circular, cylindrical filter cartridges 104. These rings are also referred to as upper and lower rings 112 and 114.

Figure 1:
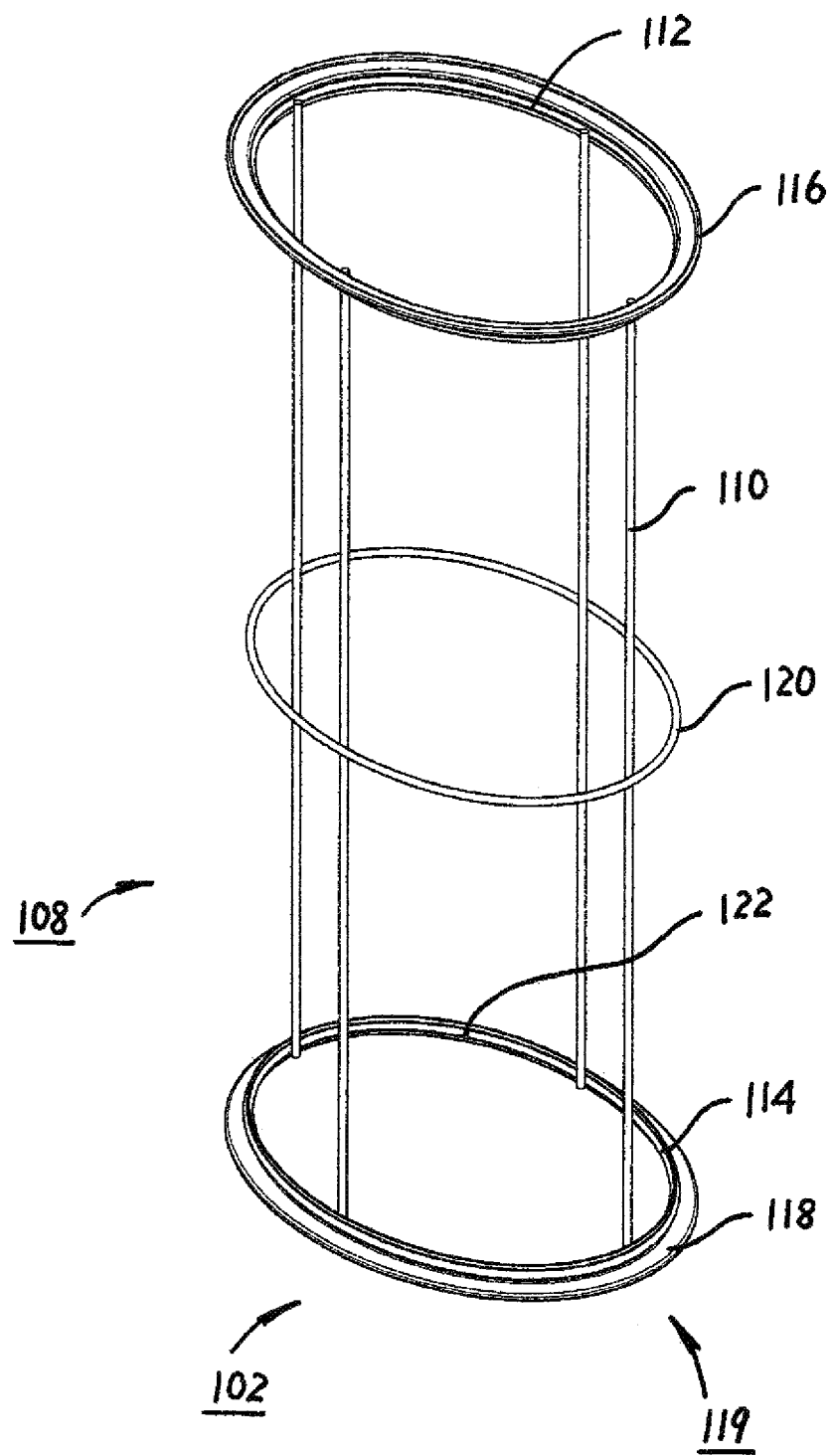
FIG. 1 is a perspective view on a non-cylindrical core showing upper and lower flanges and a formed wire frame structure.
Figures 2A, 2B:
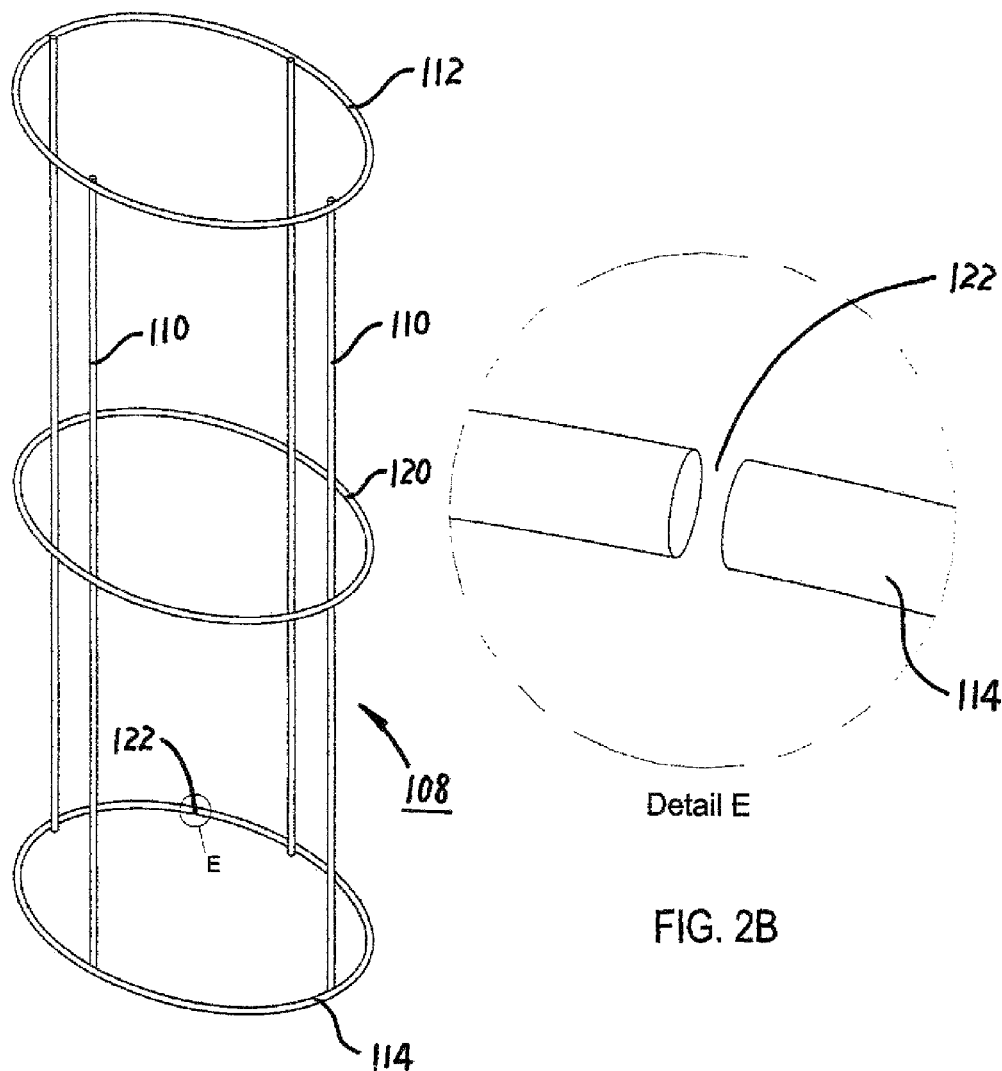
FIG. 2a is a perspective view of the wire frame structure.
FIG. 2b is an enlarged perspective view of feature E shown in FIG. 2a of the gap in the non-circular ring.

Lower flange 118 is detachable from lower ring 114 by compressing lower ring 114 which is permitted by the introduction of gap 122 in lower non-circular ring 114. In FIG. 1 lower flange 118 is shown in an attached position 119. FIGS. 2A and 2B show the gap 122 in the lower ring 114 of wire frame 108.

FIG. 2B is an enlarged view of gap 122 in lower ring 114. The size of gap 122 is just enough to allow compression of lower ring 114 such that lower flange 118 can be detached from lower ring 114.

Referring now to FIGS. 3, 4 and 5 which show upper flange 116 and lower flange 118. Note that upper flange 116 and lower flange 118 are identical other than orientation. They have the same profile and shape the only difference between upper flange 116 and lower flange 118 is the orientation with respect to wire frame 108.

FIG. 3 in perspective view shows upper flange 116 and FIG. 4 in side elevational view shows upper flange 116 and indicates the radial outward direction 130. Note the radial inward direction is the opposite to the radial outward direction 130. FIG. 5 in an enlarged view of feature A shown in FIG. 4 showing the profile of the outer rim of upper flange 116 which includes a radial leg 132, an longitudinal leg 134, a semi-circular groove 136 and a curled section 138. Lower flange 118 includes the identical features oriented up side down Semi-circular groove 136 is designed to receive upper ring 112 or lower ring 114 therein.

As indicated previously upper flange 116 is rigidly and permanently attached to upper non-cylindrical ring 112 by welding or otherwise adhesively bonding thereto.

On the other hand lower non-circular ring 114 snaps into semi-circular groove 136 by compressing or squeezing lower non-circular ring 114 in a radial inward direction. This is possible due to the presence of gap 122 in lower non-circular ring 114. Lower non-circular ring 114 is resiliently biased against semi-circular groove 136 of lower flange 118 in the attached position 119.

Lower non-circular ring 114 is resiliently biased to fit in spring like fashion into semi-circular groove 136 thereby releaseably locking lower non-circular ring 114 into lower flange 118 thereby holding lower flange 118 in attached position 119 as shown in the first Figure.

Referring now to FIG. 6, which shows the non-cylindrical core 102 being slipped in the longitudinal direction 140 into a filter cartridge 104.

The reader of course will note that prior to inserting non-cylindrical core 102 into the filter cartridge 104 lower flange 118 is detached from lower non-circular ring 114. Filter cartridge 104 is cylindrical in shape with each end cap 142 and 144 being circular prior to insertion of the non-cylindrical care 102.

Once non-cylindrical core 102 is completely inserted into filter cartridge 104 the upper flange 116 meets with up with soft elastomeric upper end cap 142 shown for example in exploded fashion in FIG. 9. The end caps 142 and 144 take on the shape of upper and lower flange 116 and 118 respectively as depicted in FIG. 7 in the assembled position 150.

Subsequently lower flange 118 can be snapped onto lower non-circular ring 114 and attached to soft elastomeric lower end cap 144 of filter cartridge 104 as shown in FIG. 10.

In this concept filter cartridge 104 is cylindrical in shape and includes a soft elastomeric upper end cap 142 and soft elastomeric lower end cap 144 which in a non assembled position are cylindrical however it can be formed into a non-cylindrical shape as shown in FIG. 7.

In FIGS. 7 and 8 cylindrical cartridge filter with non-cylindrical core 100 is shown in the assembled position 150 and the reader will note that the upper flange 116 is not circular but rather oval. The soft elastomeric upper end cap 142 has taken on the shape of upper flange 116.

The same is true of the lower end wherein the soft elastomeric lower end cap 144 takes on a similar shape as deformed end cap 152 shown in FIG. 7.

FIG. 8 shows cylindrical cartridge filter with non-cylindrical core 100 in an assembled position 150 wherein the elastomeric end caps 142 and 144 are engaged to upper flange 116 and lower flange 118 respectively.

In enlarged fashion in FIGS. 9 and 10 the positioning of upper non-circular ring 112 is depicted together with upper flange 116 and soft elastomeric upper end cap 142.

Similarly in FIG. 10 lower non-circular ring 114 is shown attached to lower flange 118, which in turn is connected to soft elastomeric end cap 144.

The reader will note that there are many benefits to the present concept the first being that the non-cylindrical core 102 can be easily removed and detached from the filter cartridge 104. In this manner incineration of filter cartridge 104 is more easily accomplished and the non-cylindrical core 102 can be recycled and reused.

The reader will also note that non-cylindrical core 102 may in fact be cylindrical or can be non-cylindrical for example oval as is depicted in FIG. 7. Many other shapes are possible that fall into the scope of this invention such as oblong, acicular, rectangular with rounded corners, triangular with rounded corners etc.

The advantage of a non-cylindrical core 102 is that in applications where non-cylindrical shaped filter elements are required one can use a cylindrical filter cartridge 104 and fit it to a non-cylindrical core 102 to create a non-cylindrical shape as shown in FIG. 7.

We claim:

1. In combination a detachable core and a cylindrical filter cartridge, the combination comprises:
    a) a filter cartridge including elastomeric end caps and a cylindrical filter element including filter pleats;
    b) a wire frame which includes at least two vertical struts oriented along a longitudinal direction;
    c) the wire frame includes an upper ring and a lower ring mounted in radial planes to the distal ends of the vertical struts;
    d) the wire frame includes an upper flange and a lower flange cooperatively mounted to the upper and lower rings respectively;
    e) wherein the lower ring includes a means for detachably mounting to the lower flange thereby allowing the filter cartridge to be inserted and detached from the core by sliding the cartridge on and off of the core along the longitudinal direction when said lower flange is detached from said lower ring;
    f) wherein the means for detachably mounting includes a gap in the lower ring to enable resilient compression of the ring by squeezing the lower ring in a radial inward direction prior to engagement with the lower flange;
    g) wherein the lower ring resiliently engages in the radial outward direction with an annular groove defined in a longitudinally extending leg of the lower flange, thereby placing the lower ring in an attached position, and retaining the elastomeric end caps of the filter cartridge on the core by abutting a radial leg of the flanges with the end caps of the filter cartridge.

2. The combination claimed in claim 1 wherein the groove defined in the longitudinal leg of the lower flange is a semi-circular groove.

3. The combination claimed in claim 1 wherein the flanges are L-shaped defined by the longitudinally extending leg and the radially extending leg for engaging with end caps of the filter cartridge.

4. The combination claimed in claim 1 wherein the vertical struts are rigidly connected to the upper ring.

5. The combination claimed in claim 1 further including a central ring rigidly mounted to the vertical struts, midway between the distal ends of the vertical struts.

6. The combination claimed in claim 1 including three vertical struts.

7. The combination claimed in claim 1 including four vertical struts.

8. The combination claimed in claim 1 wherein the cooperating rings and flanges are non-circular such that the elastomeric end caps of the cylindrical filter cartridge conforms to the non-circular shape of the upper and lower flanges when mounted thereon and in an assembled position.

9. The combination claimed in claim 8 wherein the means for detachably mounting includes a gap in the lower ring to enable resilient compression of the ring by squeezing the lower ring in a radial inward direction prior to engagement with the lower flange.

10. The combination claimed in claim 9 wherein the lower ring resiliently engages in the radial outward direction with a groove defined in the lower flange thereby placing the lower ring in an attached position.

11. The combination claimed in claim 10 wherein the groove defined in the lower flange is a semi-circular groove.

12. The combination claimed in claim 11 wherein the flanges include a longitudinal leg and a radial leg for engaging with end caps of the filter cartridge.

13. The combination claimed in claim 12 wherein the vertical struts are rigidly connected to the upper ring.

14. The combination claimed in claim 13 further including a non-circular central ring rigidly mounted to the vertical struts, midway between the distal ends of the vertical struts.

15. The combination claimed in claim 8 including three vertical struts.

16. The combination claimed in claim 8 wherein the rings and cooperating flanges are oval in shape.

* * * * *